Figure 1:
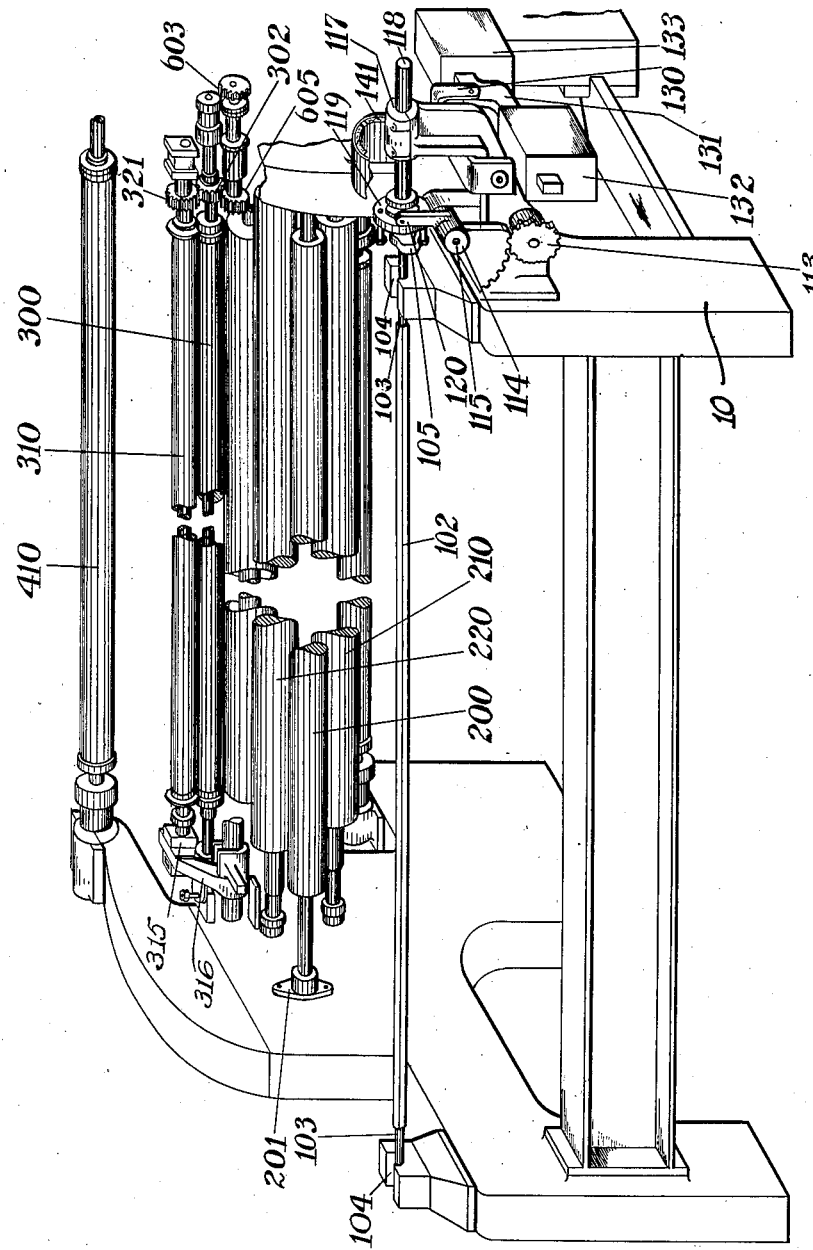

July 2, 1935.　　C. E. COLEMAN ET AL　　2,006,943
SLITTING MACHINE
Filed April 1, 1932　　12 Sheets-Sheet 1

Clarence E. Coleman  INVENTORS
Lee B. Molyneux
BY
　　　ATTORNEY.

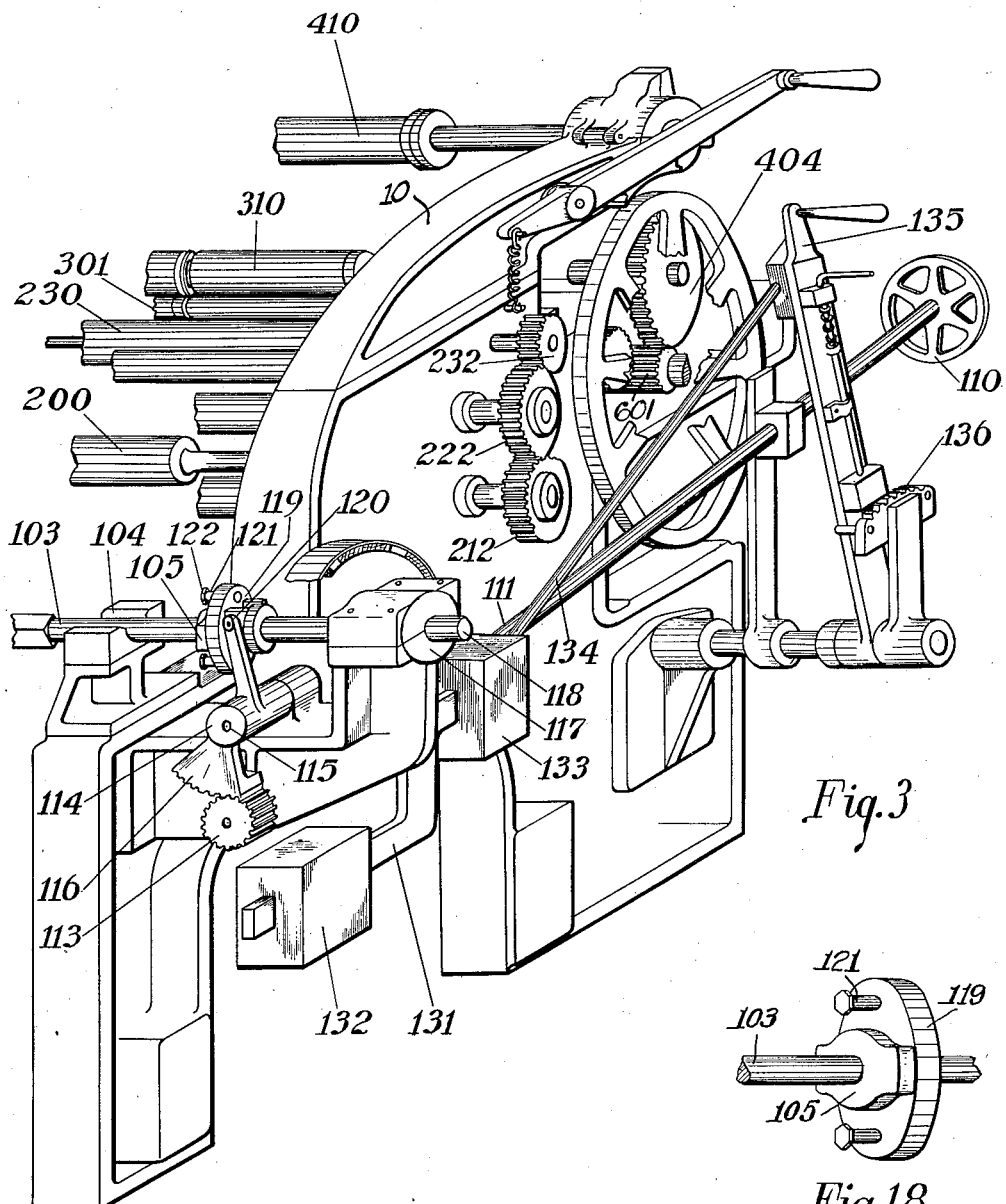

July 2, 1935.  C. E. COLEMAN ET AL  2,006,943
SLITTING MACHINE
Filed April 1, 1932   12 Sheets-Sheet 4

INVENTORS
Clarence E. Coleman
Lee B. Molyneux
BY
John Lawrence Seymour
ATTORNEY.

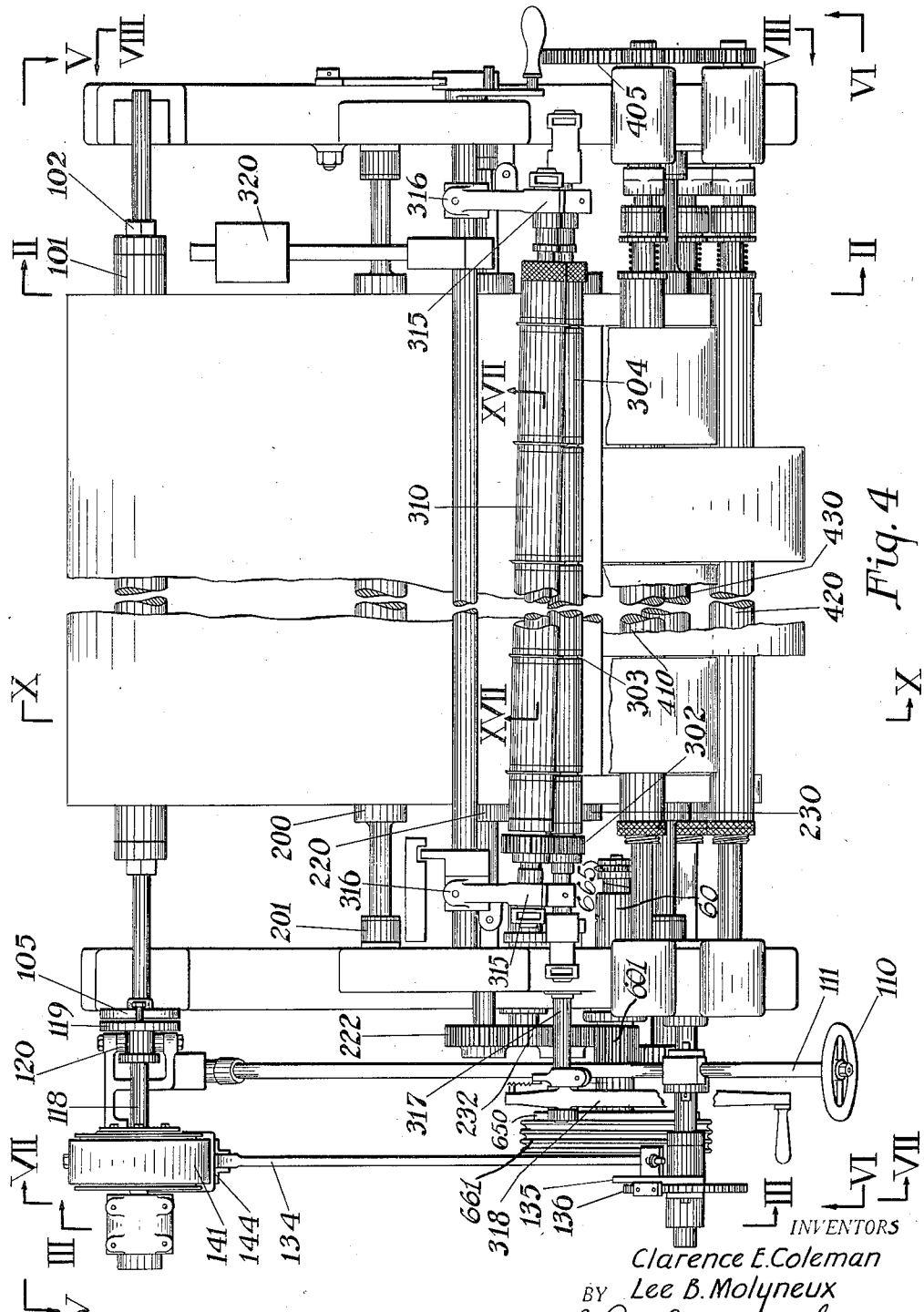

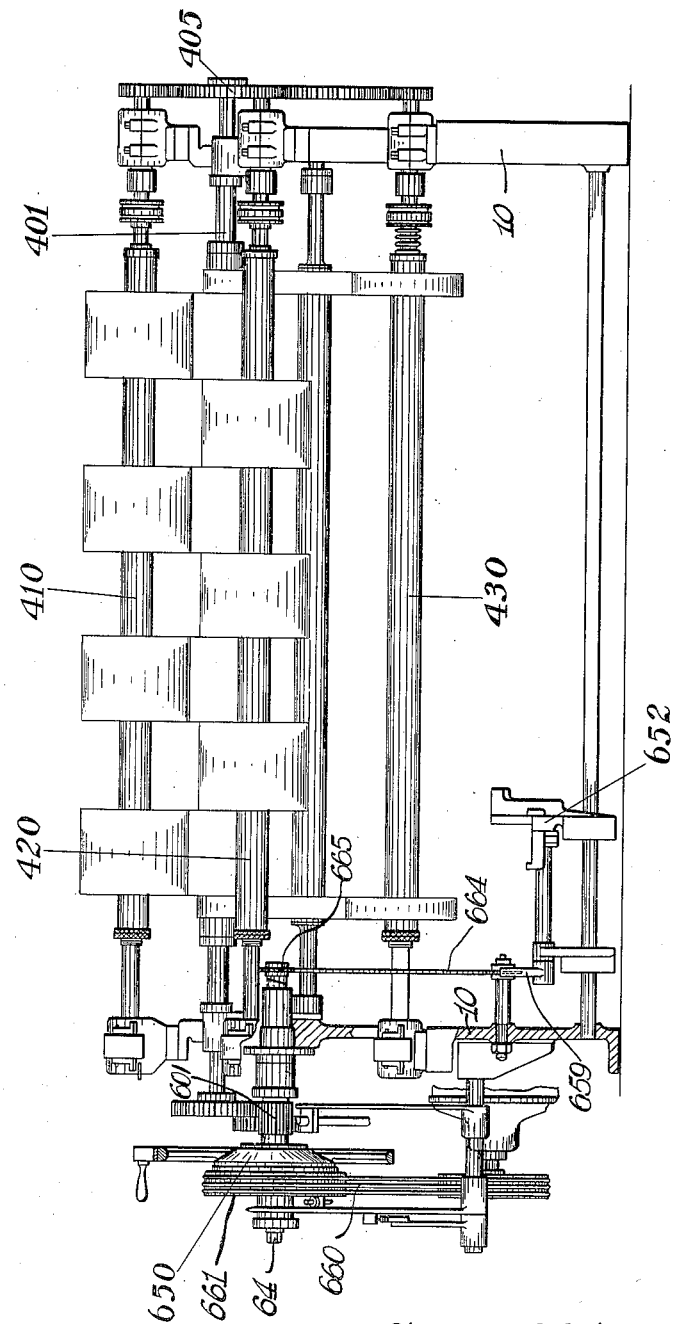

July 2, 1935.  C. E. COLEMAN ET AL  2,006,943
SLITTING MACHINE
Filed April 1, 1932   12 Sheets-Sheet 8
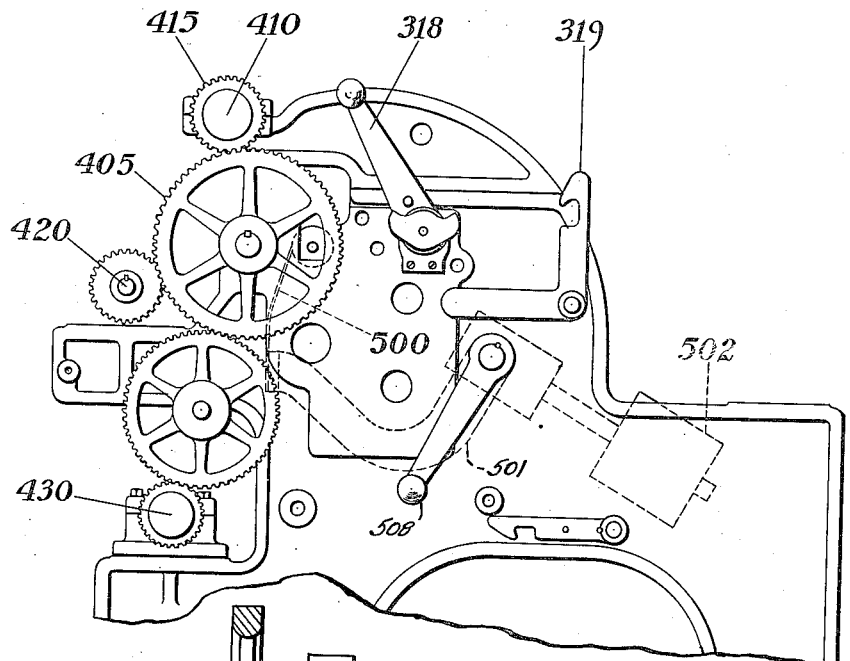
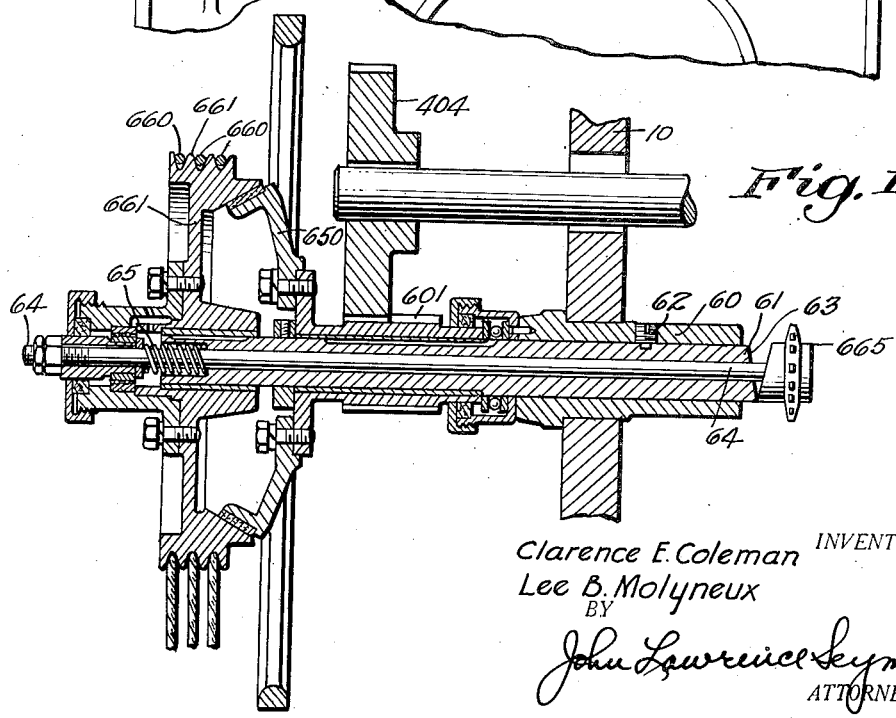
Clarence E. Coleman  INVENTORS
Lee B. Molyneux
BY
John Lawrence Seymour
ATTORNEY.

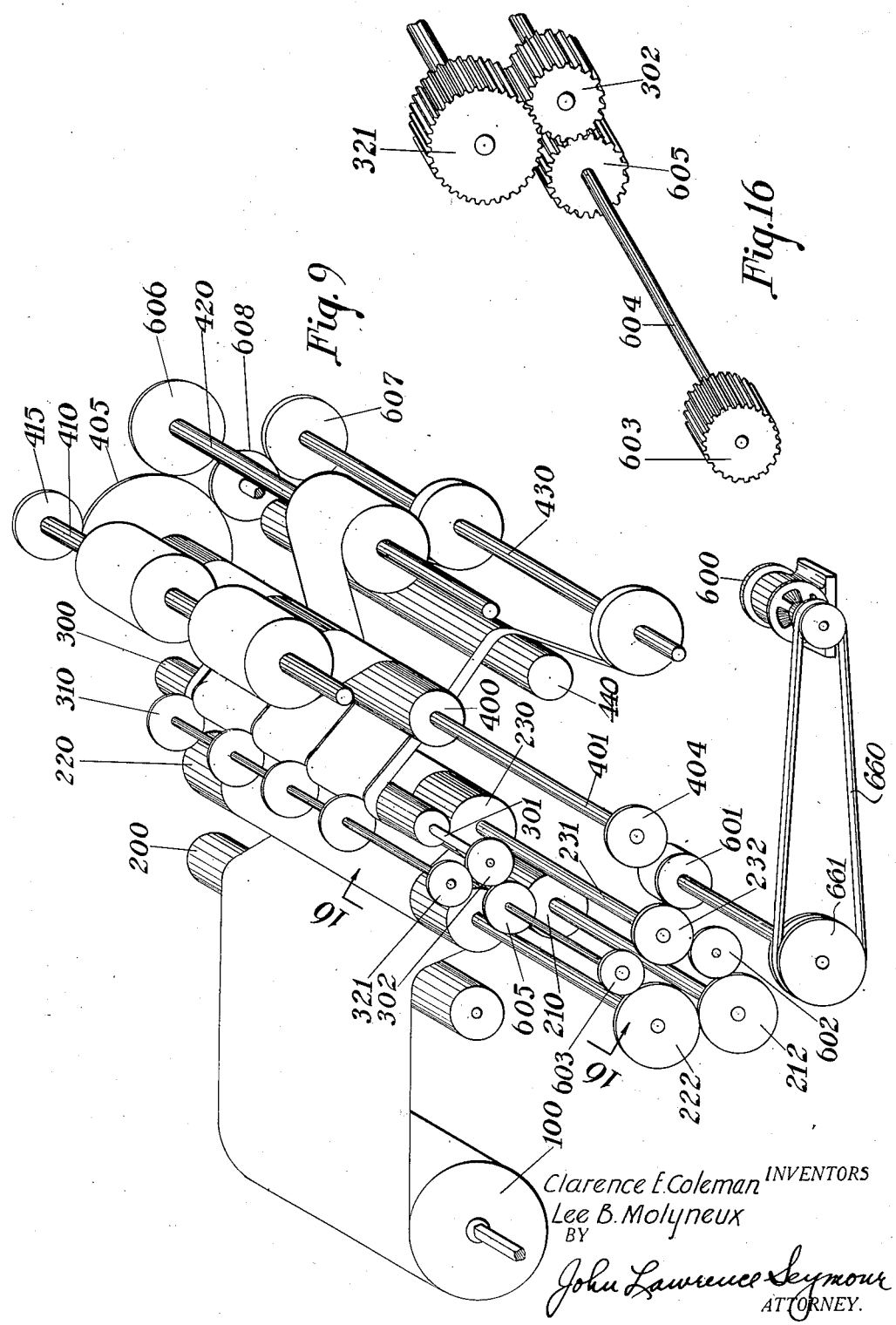

July 2, 1935.  C. E. COLEMAN ET AL  2,006,943
SLITTING MACHINE
Filed April 1, 1932  12 Sheets-Sheet 11

IDLER ROLL

TAKE OFF ROLL

SUPPORTING ROLL

WIND UP MANDREL

DRIVEN ROLL

Clarence E. Coleman  INVENTORS
Lee B. Molyneux
BY
John Lawrence Seymour
ATTORNEY.

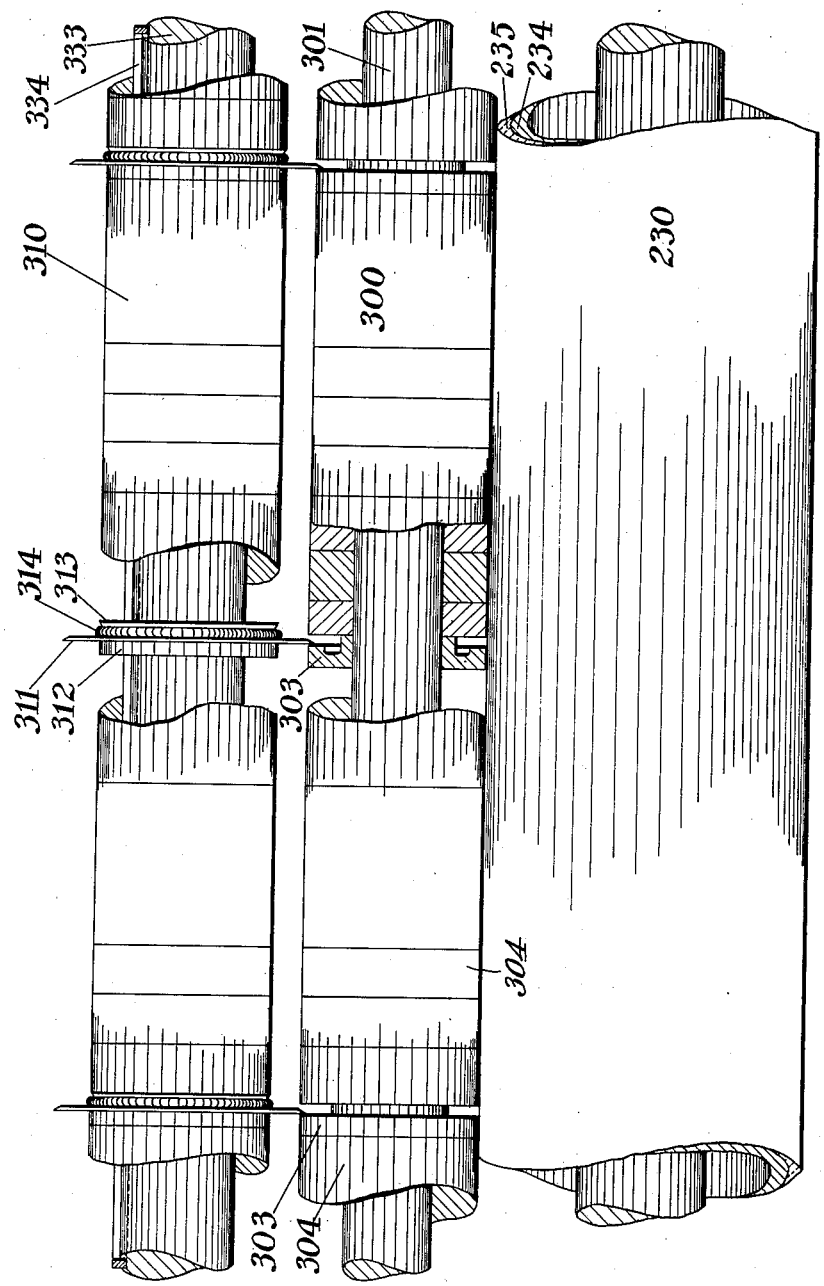

Patented July 2, 1935

2,006,943

UNITED STATES PATENT OFFICE 2,006,943

SLITTING MACHINE

Clarence E. Coleman and Lee B. Molyneux, Buffalo, N. Y., assignors to Du Pont Cellophane Company, Inc., New York, N. Y., a corporation of Delaware Application April 1, 1932, Serial No. 602,476

33 Claims. (Cl. 164—65)

This invention relates to the art of slitting. The invention also relates to a slitting machine. The invention relates more particularly to a method and means of slitting flexible and extremely thin pellicles.

The art of slitting paper pellicles is old. In that art the pellicle is unrolled from a roll, carried past the slitters, and wound in narrower widths on mandrels. The problems which concern the art of slitting paper have, substantially speaking, been solved. It has been found that satisfactory slitting can be done by knife edges, by shear cutting machines, or by score cutting machines without a great deal of difference in the result. In short, so long as the knives are maintained in proper condition, these three methods of slitting produce substantially equivalent cuts when applied to paper.

In recent years a new wrapping material has been widely adopted. It consists of an extremely thin and smooth, and very flexible pellicle of regenerated cellulose. Similar wrappings may also be made from cellulose esters and ethers. It has been found by experience that the machines which proved so satisfactory in the slitting of paper are comparatively unsatisfactory when applied to the slitting of these thin cellulosic pellicles, whose extreme lightness and flexibility allow them to be easily distorted. This distortion is aided by the smoothness of the peillicle surface, which is such that the prior art smoothing devices fail to grip it and permit it to slip and wrinkle. Some of this distortion takes place just before the slitting knives and produces an uneven edge, regardless of the type of slitter used.

Slitters working on the score cut principle have the additional disadvantage that they crush rather than cut the pellicle, leaving an edge feathery to the sight which, under a microscope, discloses nicks and cuts in the edges of the pellicle, from which frequent breaks and tears develop, particularly when used in automatic wrapping machines. The edge produced by score cutting machines, furthermore, discloses under the microscope whole "logs" torn away from the edge of the pellicle.

Prior art slitting machines working on the shear cut principle are, on the other hand, unsatisfactory in that, if the male and female cutters are not pressed tightly against each other, the pellicle, because of its thinness and flexibility will be deformed, passing around and between the knives, and not cut. Then, too, shear cut slitting machines built on other principles than those involved in our invention, lacking any support for the travelling pellicle at the instant of slitting, deform the pellicle to a certain extent regardless of the sharpness and accurate alinement of the knives.

Slitting machines working on the knife blade principle are not satisfactory for many of the reasons cited above in regard to the other machines and for the additional reason that the blades become dull after very short usage and tear the pellicle. Manufacturers have found, consequently, that the slitting machines of the prior art are not satisfactory when used for slitting cellulosic pellicles.

It is an object of this invention to provide a method and means of slitting flexible pellicles of extreme thinness. Another object of the invention is to provide a slitting machine capable of slitting thin and smooth pellicles, and capable of slitting them at a high rate of speed and accurate uniform widths having clean cut edges. Another object of the invention is to support the pellicle at the moment of cutting. Another object of the invention is to insure continuous point contact of the cutting elements. Another object of the invention is to pass a thin, flexible, and very smooth pellicle to the cutters in a smooth condition. Another object is to control the pellicle from mill roll to wind-up. Other objects of the invention are the construction of the detailed elements of the machine. Another object of the invention is in the arrangement of the functions and elements of the machine in combination. Other objects of the invention will be in part obvious and in part hereinafter described.

The objects of the invention are accomplished by the methods and means hereinafter fully set forth.

Figure 2:
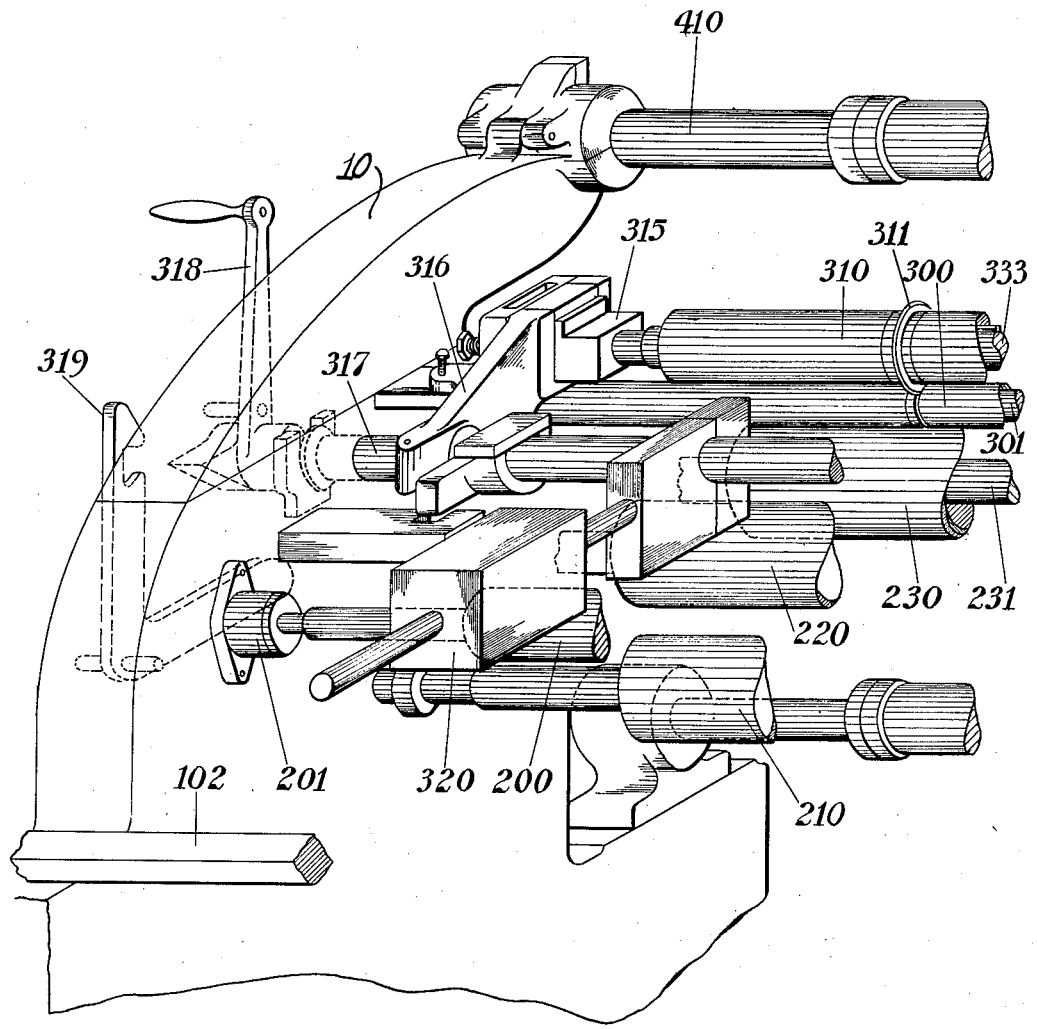
Figure 5:
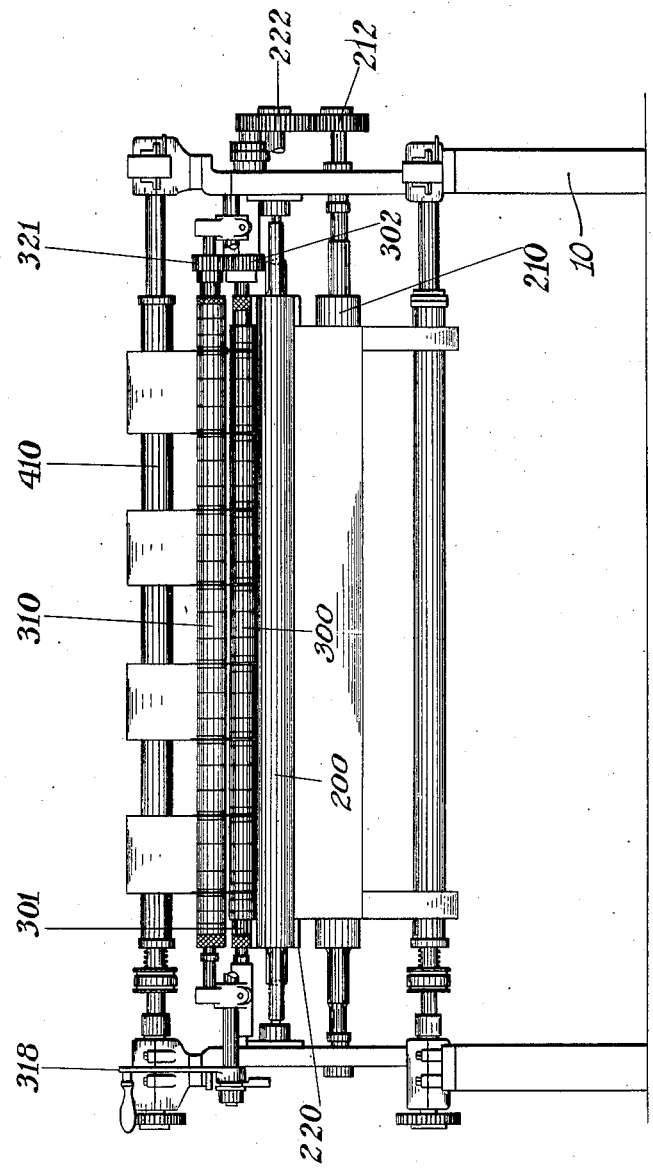
Figure 7:
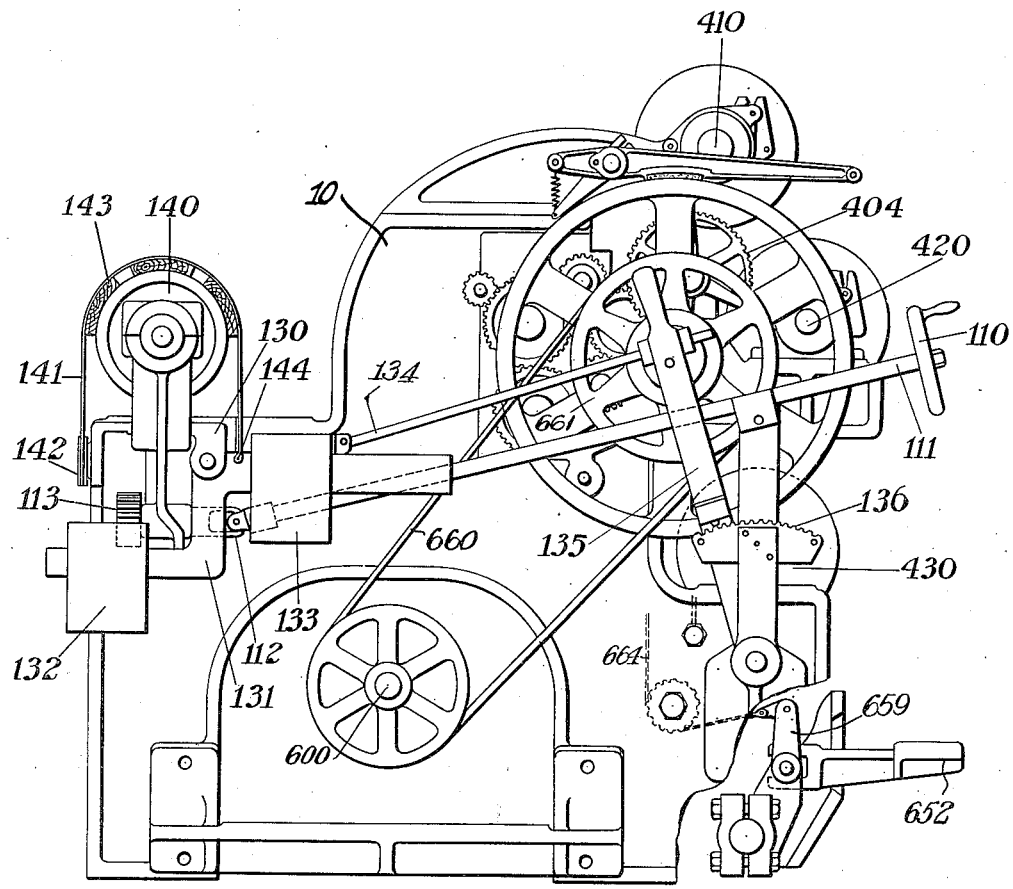
Figure 10:
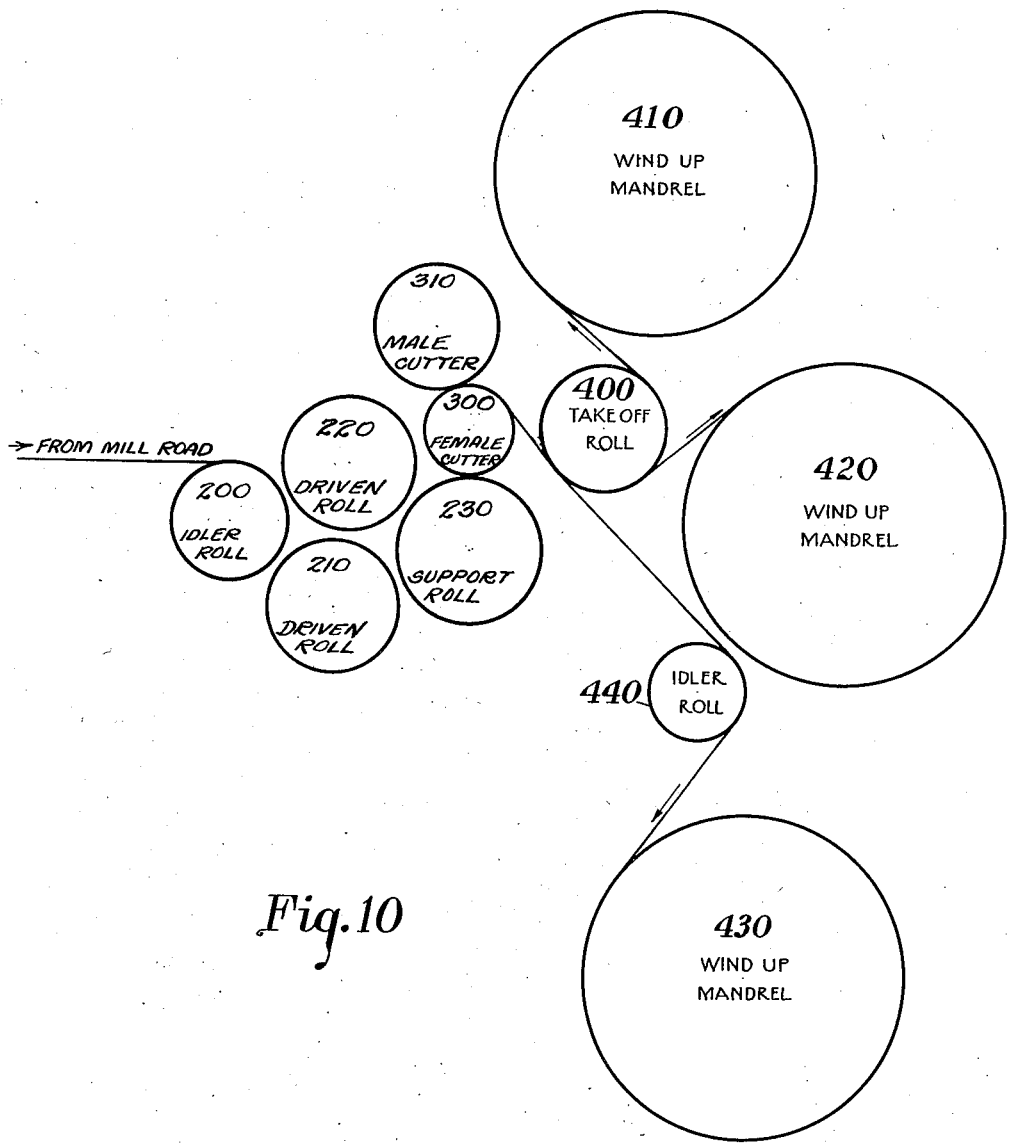
Figure 11:
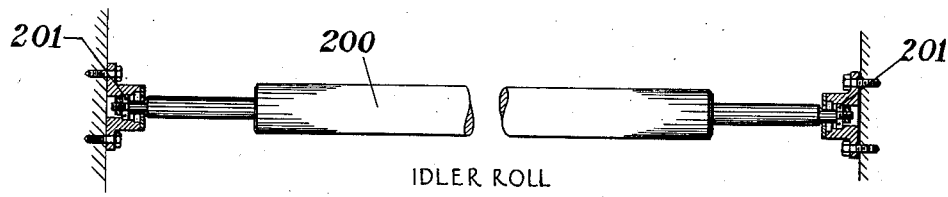
Figure 12:
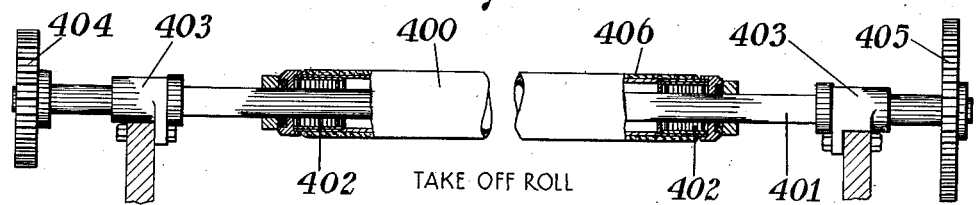
Figure 13:
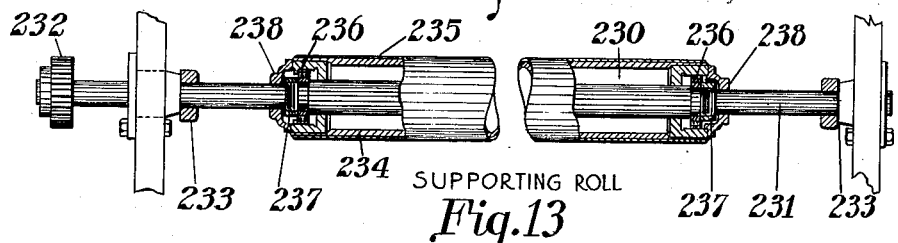
Figure 14:
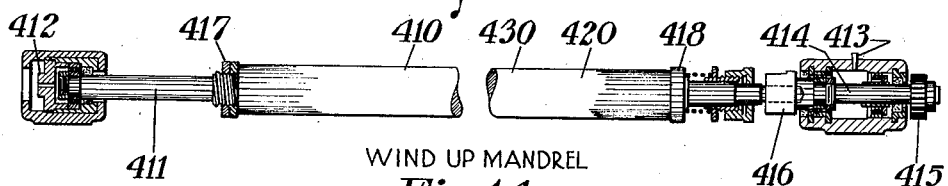
Figure 15:
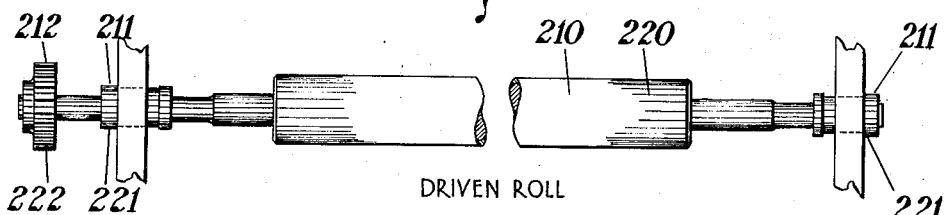

In the drawings Fig. 1 is a perspective view of the slitting machine from the mill roll end, parts of the frame at the right being broken away; Fig. 2 is a perspective view of the left side of the machine taken from the mill roll end or on the line II—II of Fig. 4; Fig. 3 is a perspective view of the right side of the machine with certain parts broken away taken on the line III—III of Fig. 4, or from the mill roll end; Fig. 4 is a plan view of the machine with the mill roll at the top of the sheet; Fig. 5 is an elevational view of the machine from the mill roll end, or on the line V—V of Fig. 4 with the mill roll removed; Fig. 6 is an elevational view of the machine from the wind-up end or from the line VI—VI of Fig. 4; Fig. 7 is a side elevational view of the right side of the machine with the mill roll at the left or from the line VII—VII of Fig. 4; Fig. 8 is an elevational view of the left side of the machine with the mill roll at the right or from the line VIII—VIII of Fig. 4; Fig. 9 is a perspective diagram to show the arrangement of rolls, slitters, wind-up and gears; Fig. 10 is a diagram to show the arrangement of rollers, cutters, and wind-up mandrels taken on line X—X of Fig. 4; Fig. 11 is a detailed view of an idler roll; Fig. 12 is a detailed view of the take-off roll; Fig. 13 is a detailed view of the supporting roll; Fig. 14 is a detailed view of a wind-up mandrel; Fig. 15 is a detailed view of a driven roll; Fig. 16 is a detail of a portion of the drive; Fig. 17 is a fragment taken on the line XVII—XVII of Fig. 4 showing the relation and construction of slitters and support roll; Fig. 18 is a detail of the removable connection between 105 and 119; Figure 19 is a vertical cross section through the clutch, its operating mechanism, and the main driving gear.

For the purpose of clarifying as far as possible the great but unavoidable complexity of the drawings and description, the invention will be described with relation to the various functions of the machine. In general the machine performs five functions.

The first of these functions is that of holding and unwinding the mill roll. The mill roll, as will be understood by persons skilled in the art, is a wide pellicle wound about a core in the form of a roll. This roll may come from the casting machine or from any other source; the term "mill roll" is used for convenience, not for purposes of limitation. This mill roll is brought to the machine and is mounted at the mill-roll end. The pellicle is then threaded through the machine and is attached to the wind-up mandrels which, in conjunction with certain driven rolls in the machine, draw the pellicle through the machine and past the cutters. A highly responsive mechanism is used for preventing the mill roll either from overrunning or from lagging too much. The mechanism which accomplishes this purpose will be described in detail as the mill roll mechanism.

A second function which the machine accomplishes is that of smoothing the pellicle before it is fed to the cutters. The prior art has arranged one or more smoothing rollers before the cutters, but the prior art arrangements have not proved satisfactory with thin cellulosic pellicles. It has been found that the only way to satisfactorily smooth the pellicle by rollers is to use the principles of the smoothing arrangement herein described.

A third function performed by the machine is that of slitting the travelling pellicle. A major problem in connection with this function was to support the pellicle up to and at the moment of slitting in order to prevent distortion and uneven cutting. Another major problem in connection with the slitting function of the machine was that of maintaining all knives in proper cutting contact at all times. The method by which these problems were solved is set forth hereinafter.

A fourth function which the machine performs is that of winding the slit pellicle into rolls.

A fifth function which the machine performs is that of controlling the passage of the pellicle through the machine and past the cutters. By the number of rolls, the character of their surfaces, and their arrangement the pellicle is prevented from slipping either sidewise or in the machine direction; the tension on the pellicle is made and is kept uniform, and the pellicle is laid out evenly.

In the construction of the mill roll mechanism 100 is the mill roll; 101 is a core upon which the mill roll is wound; 102 is a rectangular supporting bar; 103—103 are bearings in the ends of said bar which fit for rotational and sliding movement in trunnions 104 of the frame 10. These trunnions may be open, as shown, or they may be provided with caps. 105 is a driving connection mounted on the end of bar 102; 110 is a hand wheel; 111 is a shaft mounted for rotation in the side of the frame connected to and for rotation with the hand wheel; 112 is a shaft mounted in the frame to be turned by the shaft 111; 113 is a pinion gear mounted on the end of shaft 112; 114 is a lever; 115 is a fulcrum on which the lever is mounted; 116 is a rack on the lever meshing with gear 113; 117 is a bearing; 118 is a shaft mounted for rotational and sliding movement in the bearing 117; 119 is a head on shaft 118; 120 is a connection between the lever 114 and the head 119; 121 are pins mounted in the head 119; 122 are nuts mounted on the ends of the pins; 130 is a support; 131 is an off-set lever pivotally mounted on support 130; 132 is a weight slidably mounted on lever 131; 133 is a weight of mass approximately equal to the weight of 132 slidably mounted on the other end of lever 131; 134 is a rod attached to weight 133; 135 is a hand lever attached to rod 134; 136 is a catch to hold lever 135 in selected position; 140 is a brake wheel fixedly attached to shaft 118; 141 is a brake band fixedly attached at 142 to the frame of the machine; 143 are friction surfaces, as of cork or the like, on brake band 141; 144 is a connection between the end of brake band 141 and lever 131.

The mill roll structure functions as follows:
The interior of core 101 has a rectangular hole which fits the rectangular supporting rod 102. The pellicle from the mill roll is threaded through the machine and attached to the wind-up mandrels. When the machine is started the wind-up mandrels in connection with certain driven rollers draw the pellicle off the mill roll and pass it through the machine. As the mill roll turns, the shaft 102 turns with it and the head 105 contacts with pins 121 between the heads of the nuts 122 and the head 119. The head 119, consequently, is forced to turn by the head 105 and turns against the action of brake 141. The tension of the brake can be regulated by the operator of the machine by moving weight 133 toward or away from the fulcrum of the off-set lever. This adjustment can be made from operating position by means of lever 135. The mill roll is held in position lengthwise of the bar by any suitable means. The bar and mill roll can be moved sidewise of the machine by the operator. This adjustment is accomplished by rotating the hand wheel 110 which turns the gear 113 which shifts the lever 116 which, in turn, shifts shaft 118 and shaft 103 with the mill roll. The nuts 122 on the pins 121 prevent the disengagement of head 105 from head 119 during this shifting operation.

When a new mill roll is to be put on the machine, the shaft 102 is turned until the ends of head 105 are free of nuts 122, from which position it may be freely lifted out.

In the construction of the smoothing, controlling, and feeding mechanism 200 is an idler roll; 201—201 are anti-friction bearings carried on the frame to mount the idler roll. This idler roll is assembled as a unit with its bearings before being put in place in the machine. 210 is a driven roll about which the pellicle makes a substantially full turn; 211—211 are bearings mounted in the frame of the machine in which the roll 210 is mounted; 212 is a driving gear mounted on an end of the roll which may project beyond the machine frame; 220 is a driven roll so arranged in relation to the roll 210 and the support roll (hereinafter described) that the pellicle takes substantially a full turn about it; 221—221 are bearings mounted in the frame for supporting roll 220; 222 is a driving gear mounted on the projecting end of roll 220 meshing with gear 212; 230 is a roll which not only serves in conjunction with the idler roll and the driven rolls to smooth the travelling pellicle, but also serves as a support for the female cutter; 231 is a driven shaft mounted in and projecting at one end beyond the frame 232 is a gear on the end of shaft 231 meshing with gears 601, 602; 233—233 are bearings mounted in the frame for rotatable supporting shaft 231; 234 is a metal sleeve; 235 is a coat of rubber or of other resilient material on the surface of sleeve 234 which serves to take and absorb any shocks which might otherwise be transmitted to the female cutter; 236—236 are anti-friction bearings held against the shoulders on shaft 231 by nuts 237 on which the sleeve 234 is mounted; and 238 are caps to close the ends of the sleeve. Rollers 210 and 220 are covered with rubber or with other gripping and resilient material.

The function of the mechanism just described is as follows:

The pellicle comes from the mill roll and passes around idler roll 200 and around the driven rolls and the supporting roll. These rolls are driven at the same surface speed, exerting a gripping and controlling action upon the speed of the pellicle as it passes the cutters, and smooth the pellicle so that the cutters can give a clean cut and can slit a pellicle into smaller pellicles of accurate width. Since the lower or female cutter rests upon the resilient surface of the roll 230, the surface speed of roll 230 and of the lower cutter must be identical in order to prevent the marring of the soft surface of the pellicle. It is substantially impossible to obtain this identity of surface speed by a gear drive since there will almost inevitably be a slight difference in surface speeds. This disability is taken care of by the supporting roll construction as hereinbefore described. This roll is a sleeve mounted by anti-friction bearings on a driven shaft. In normal circumstances, consequently, the sleeve will turn as a unit with the shaft. Should there be, however, a slight difference in surface speed between the surface of the female cutter and the surface of the supporting roll, the supporting roll will conform its speed to that of the lower cutter and the surface of the pellicle which is between them will not be marred. We have discovered that an idler roller substituted for this construction is not satisfactory since it imposes a certain amount of tension on the pellicle through the necessity which the pellicle is under of turning the roll in passing. Our construction of supporting roll relieves the pellicle of all strain since the roll is normally driven and provides a take up for minute differences between the surface speeds of the lower cutter and the supporting roll.

In the figures, and particularly in Figure 10, the description is to be taken merely as a diagrammatical illustration and not as a representation of the actual amount of roll-surface which is in contact with the pellicle. The arrangement of the idler roll, two driven rolls and the support roll is actually such that only the minimum space is permitted between rolls and substantially the entire surface of each roll is in contact with the pellicle.

In the slitting mechanism, in adition to support roll 230, 300 designates generally the lower or female slitter; 301 is a driven shaft on which the slitting elements of the female cutter are mounted; 302 is a driving gear mounted on the shaft 301; 303 are slitting elements of the female slitter; 304 are spacing, pellicle supporting sleeves of diameter precisely equal to the diameter of cutters 303 mounted on shaft 301. These spacing sleeves may be long, as shown to the left of Figure 17, or they may be short and of different size, as shown at the right of Figure 17. The spacers and the female cutting members have accurately machined faces for the triple purpose of preventing gaps which could mar or distort the pellicle, for permitting the operator to assemble male and female cutters by the simple process of dropping sleeves and cutters of the proper length upon the respective shafts, and for the purpose of obtaining slit pellicles of accurate width. 310 indicates generally the upper or male slitter; 311 are the male cutting knives; 312 are annular cutting knife holders; 313 are annular grooves in the cutting knife holder; 314 are springs mounted in the groove which hold the knife 311 against the shoulder of holder 312 for spring action; 333 is a shaft on which the assemblage is mounted; 334 is a key fitting in channels in shaft 333 and sleeves 310 and knife holders 312; 315—315 are bearings supporting shaft 333 for rotation; 316—316 are arms carrying bearings 315 in their ends; 317 is a rotatable shaft on which arms 316 are fixedly mounted; 318 is a lever by means of which the shaft 317 may be turned to raise the male slitters out of contact with the female slitters; 319 is a catch by means of which the male slitters may be maintained in raised position. Associated with the lever 318 and shaft 317 is a mechanism, not shown, for disengaging the cooperating knives axially. 320 is a weight by means of which the weight of the upper cutter shaft is counterbalanced; 321 is a gear, in mesh with gear 302, for driving the upper cutter shaft.

In the prior mounting of shear cut slitters the face of one cutter is placed firmly against the face of its cooperating cutter. It almost inevitably follows that, as the knives wear slightly, the pellicle tends to bend beneath the knife rather than to be cut by it. The difficulty of maintaining the knives in proper contact is, furthermore, practically insurmountable. These difficulties of the prior art are absolutely avoided and overcome if the axes of the cutters are placed at a slight angle one to another. In Figure 4 of the drawings this arrangement is clearly shown, the upper cutter bar being placed at a slight but definite angle to the lower cutter bar. By means of this arrangement the knife blades are always maintained in firm and, by means of the spring mounting of the upper blade, resilient, point contact.

The operation of the slitting mechanism is as follows:

The upper cutter set is swung out of engagement with the lower cutters while the pellicle is threaded through the machine. The upper cutters are then moved into operative position, a point of each knife blade of the upper cutter being in contact with a point on the cutting faces of a cooperating lower knife. The pellicle leaving the second driven roll passes around the rubber-covered supporting roll and on to the surface of the female cutter which rests on the surface of the support roll. By the action of the idler roll and the driven rolls the wrinkles are taken out of the pellicle and it is passed to the surface of the support roll in a smooth condition. On the surface of this roll any remaining minute wrinkles are removed before the pellicle passes to the slitters. Since the female slitter rests directly on the surface of the support roll, there is no opportunity for wrinkles to creep into the pellicle by transference from one roll to another. Since the support roll is freely mounted on a driven shaft, it accommodates itself with absolute accuracy to the surface speed of the female cutter and accomplishes the transference of the pellicle to the female cutter without strain or marring.

The pellicle is supported throughout its entire length on the surface of the female cutter with the exception of the comparatively minute surface provided for the operation of the upper knife blades. By this arrangement the tendency of the light pellicle to wrinkle and to sag away from the knife is overcome without the slightest strain, and the pellicle is fully supported up to and during the moment of slitting.

In the construction of the winding mechanism 400 is a take off roll whose function is to transfer the divided pellicle from the slitters to the wind-up mandrels; 401 is a shaft on which the take off roll is mounted which is driven to rotate the roll with the pellicle at a surface speed equal to the speed of the pellicle; 402—402 are roller bearings between the take off roll and the shaft 401 which permit the take off roll to revolve freely about the shaft and to absorb differences between the speed of the pellicle and the speed of the roll without strain on the pellicle; 403—403 are bearings in the frame for shaft 401; 404 is a gear at one end of the shaft 401; 405 is a gear at the other end of the shaft 401; 406 is a resilient covering, as of rubber or similar material, on the take off roll.

The winding mandrels are mounted and driven in a novel manner. In the drawings, notably in Fig. 14, 410—420—430 are winding mandrels; 411 is a mandrel shaft; 417 is an abutment on the mandrel against which a cardboard core can rest; 418 is a spring pressed abutment toward the other end of the mandrel designed to press the end of another core or spacer and by endwise pressure resist the tendency of assembled cores and spacers to turn about the mandrel. In the prior art mounting of mandrels demounting and driving of the mandrel have been attended with considerable difficulty. We have surmounted this difficulty in the following manner. 413 is a cylindrical bearing seat in the machine frame; 414 is a short shaft mounted on antifriction bearings in said cylindrical seat; 415 is a gear on shaft 414; 416 is a socket in the end of shaft 414; 412 is a unitarily mounted bearing made to fit into a seat in the frame.

The function of the winding mandrel is as follows:

A cardboard core is slipped over the surface of the mandrel core 410 against abutment 417; a metal or other spacing sleeve is placed next to it; and a second core is placed next to the metal sleeve. When the mandrel has been assembled the spring pressed abutment 418 applies end pressure to the assemblage, offering resistance to attempts of the cores to turn yet allowing them to turn slightly to equalize the wind-up and to take up such minute shocks as the machine may be subjected to. Each mandrel is driven at a speed to take up fully all slack in the pellicle and to assist its progress through the machine. At the same time it is incorrect to say that the pellicle is drawn through the machine by the wind-up mandrel. The progress of the pellicle through the machine is controlled by the mill roll mechanism, the driven rollers, the support roller, the lower cutter, the take-off roller and the mandrels, all of which are interlocked, as will more fully hereinafter appear. It follows, consequently, that the progress of the pellicle through the machine is controlled, with ample protection against marring or shocks of any kind, at every step from mill roll to wind-up. One end of the winding mandrel has a shape to fit the socket 416 of shaft 414. When the mandrel is assembled with its cores and spacers, the end of the mandrel is fitted into socket 416 and the bearing 412 is dropped into its seat. In this manner the mandrels may be mounted or demounted instantaneously and the driving gears are always maintained in exact driving relation.

One of the most serious problems which confronted us in the designing of a machine for the slitting and winding of cellulosic pellicles was that of winding the slit pellicles with even tension. Where pellicles of unequal width were to be wound upon one mandrel it was found impossible to wind the wider with satisfactory tension without imposing too great tension on the narrower. We have found that this disparity increases with the increase in difference of width, and it is our discovery that this is due to the relation of the endwise pressure on the cores to the width of the pellicles wound on the same mandrel. We have overcome the difficulty by furnishing the machine with at least three winding mandrels. By this principle it is possible to wind pellicles of various widths with equal tension.

Machines of the prior art when used to slit thin cellulosic pellicles were frequently stopped by the breaking of a slit pellicle and the entangling of the slit pellicle with the cutting mechanism. In some cases the broken pellicle would wind itself around one of the cutter shafts and would become entangled with the machinery to an extent which would require ten or fifteen minutes of the operator's time to get the machine in motion again. We have surmounted this difficulty by the use of a deflector. In Fig. 8, 500 represents a deflector comprising a thin sheet of metal or of fiber or of other stiff material having resilience which extends the full length of the female cutter and has an edge in contact therewith; 501 are arms located at each side of the machine for holding the deflector 500; 502 is a counterweight adjustably mounted to balance the weight of the deflector and arms 501; 503 is a handle by which the operator can move the deflector into or out of operative position. For purposes of clarity in the drawings the deflector is shown only in Fig. 8.

The driving arrangement for the machine is important and involves several improvements. In Figures 4, 6, 7, 9, and 19 of the drawings, wherein is diagrammatically disclosed a clutch and driving gear for the machine, 600 is a source of power of any suitable kind, such as an electric motor; 660 is a power-transferring means such as a cord or belt; 661 is a pulley, or the like driven by cords 660 and forming the outer section of a clutch; 60 is a sleeve mounted in the frame 10; 61 is a sleeve carried within sleeve 60 and held against rotation by screw 62; 63 is a cam face on sleeve 61; 64 is a shaft passing through sleeve 61 upon the end of which clutch member 661 is revolvably mounted; 65 is a spring which tends to keep the portions of the clutch separated; 665 is a sprocket wheel keyed to shaft 64 and having a cam face to cooperate with the cam 63; 601 is the main drive gear revolvably mounted on shaft 61; 650 is a clutch member attached to the said gear; 664 is a sprocket chain trained about sprocket wheel 665; 659 is a lever mounted on the frame and to the end of which chain 664 is attached; 652 is a foot pedal to operate the lever, the chain, and the sprocket whereby to put the clutch in or out of position by the action of the cam faces in compressing the spring to engage the cooperating parts of the clutch; gears 232 and 404 are driven by gear 601; gear 232 drives the machine mechanism which lies toward the mill roll and gear 404 drives the machine mechanism which lies toward the wind-up; gear 232, as hereinbefore described, drives supporting roll 230; 602 is an idler gear in mesh with gear 232; 212 is a gear in mesh with gear 602 which, as hereinbefore described, drives lower driven roller 210; 222 is a gear in mesh with gear 212 which, as hereinbefore described, drives upper driven roller 220; 604 is a shaft mounted in one side of the frame; 603 is a gear in mesh with gear 222 mounted on the end of shaft 604; 605 is a gear mounted on the other end of shaft 604; 302 is a gear fixed to the end of the female cutter shaft and in mesh with gear 605; 321 is a gear in mesh with gear 302 and mounted on the upper cutter shaft. When the male cutter shaft is lifted out of operative engagement, the gears 321 and 302 disengage. The surface speed of the male cutter knives is preferably slightly higher than the surface speed of the female cutters but may be either equal to or, less desirably, less than that speed. The surface of the female cutter roll travels at exactly the speed of the pellicle.

The clutch operating mechanism operates as follows: The two sections of the clutch are normally held in engagement by a spring in a manner which will be understood by mechanical engineers. When the operator wishes to disengage the elements of the clutch, he depresses the lever 662 which rotates the arm 659 and draws the chain 664 which, being in engagement with the sprocket gear 665, rotates the shaft 663 which, being mounted in the frame on a screw thread, is moved axially, throwing the two sections of the clutch 650 out of engagement with one another. As soon as the pressure on the pedal 652 is released, the spring forces the halves of the clutch into engagement with one another. It will be obvious to all mechanical engineers that the operation of this clutch could be reversed, the spring being used normally to keep the halves of the clutch apart. It will also be obvious to mechanical engineers that other types of clutch mechanism could be used to produce the same result.

The drive for the wind-up mandrels is taken from gear 404 which is in mesh with gear 601. In this mechanism 401 is a shaft mounted in the frame and projecting therefrom at each end. Take off roller 400 is mounted for free rotational movement about this shaft. The shaft in its rotation, consequently, assists the roller 400 and renders it unnecessary for the pellicle to turn the roller. On the other hand, it does not oppose the free motion of the roller. 405 is a gear on the other end of shaft 401; 415, 606, and 607 are gears mounted on the mandrel shafts for driving the mandrels; 608 is an idler gear for transmitting motion between gear 606 and gear 607. From this construction it will be seen that the gear 405 drives the mandrels. 440 is an idler roller for directing pellicles from the take off roller to the lower winding mandrels. In some designs of the machine this roller can be dispensed with.

An advantage of this slitting machine is in its ability to cut a thin flexible pellicle of rather delicate material cleanly, accurately, and at high speed. Another advantage of the machine is in the smoothing of the pellicle before cutting and in the maintaining of the smoothness at the very moment of cutting. Another advantage of the invention is in supporting the entire pellicle at the moment of cutting. Another advantage of the machine is in the delicate, flexible, but complete control of the travel of the pellicle at all stages of the process. Another advantage of the machine is in always maintaining firm, flexible, and point contact between the edges of the cooperating slitters. Another advantage is in the assemblage of the various details of the construction of the machine in combination with one another. Other advantages of the invention are in the details of construction of the various elements of the machine. Other advantages of the invention are in part apparent and in part set forth hereinbefore.

As many apparently widely different embodiments of this invention may be made without departing from the spirit and scope thereof, it is to be understood that we do not limit ourselves to the specific embodiments thereof except as defined in the appended claims.

We claim:

1. In a slitting machine, means for smoothing an extremely thin and flexible pellicle, slitting means comprising shear cutters having substantially point contact, means for supporting substantially the entire width of the pellicle at the point of slitting, means for controlling the travel of the pellicle substantially throughout its travel, and means for winding the slit pellicle.

2. In a machine for slitting extremely light and thin pellicles, shear cut slitting means, means for supporting a pellicle at the point of slitting and at least two smooth driven rollers therebefore arranged to be substantially completely encircled by the pellicle before transference to the supporting means, the last of said rollers being in contact with the supporting means whereby the smoothed pellicle will be transferred unwrinkled to the supporting means.

3. In a machine for slitting extremely light and thin pellicles, shear cut slitting means, means for supporting a pellicle at the point of slitting comprising a portion of the slitting means, and at least two driven rollers therebefore arranged to be substantially completely encircled by the pellicle before transference to the supporting means, the last of said rollers serving to carry the said supporting means, whereby the pellicle will be further smoothed by pressure and will be transferred unwrinkled to the said supporting and slitting means.

4. A slitting machine having cooperating shear cutting members comprising two series of circular knives of which each series is rotatably carried by a shaft and having one said shaft at an angle to its cooperating said shaft.

5. In a slitting machine, a mill roll mechanism comprising a rotatable mill roll support, adjustable means for opposing the rotation of said support, means for drawing and smoothing a pellicle from the mill roll comprising rollers so arranged as to give at least two substantially full turns to the pellicle with substantially no point of freedom between them, means for driving at least one of said rollers, means for slitting the pellicle comprising upper and lower cooperating shear cutters arranged for substantially resilient point contact, the said lower slitting member having a substantially cylindrical surface, means for supporting said lower member substantially throughout its entire length, means of said supporting means and lower slitting means for further smoothing said pellicle, and means for winding the slit pellicle.

6. In a slitting machine shear cut slitting means, means for passing a pellicle from a mill roll past the slitting means, mill roll supporting and controlling mechanism comprising a noncircular supporting rod having a cross section to fit in opening in a mill roll core and mounted for rotational and sliding motion in the machine frame, a T-shaped head on said rod, a shaft mounted rotatably and slidably in the machine frame axially of the said rod, a head on said shaft in abutting relation to the said T-shaped head, head pins in the shaft for locking engagement with said rod head, a brake drum on said shaft, a lever pivoted on its center on the machine frame, a weight adjustably mounted toward each end of the said lever, a brake band contacting said brake drum and attached at one end to the machine frame and at the other end to said lever, means for shifting said weight along said lever to adjust the braking effect of said band on said drum, a lever attached to said shaft head, and means for moving said lever and said shaft to adjust said mill roll rod laterally of the machine.

7. In a slitting machine shear cut slitting means, means for passing a pellicle from a mill roll past the slitting means, mill roll supporting and controlling mechanism comprising a mill roll supporting rod mounted for rotational and sliding motion in the machine frame, a shaft mounted rotatably and slidably in the machine frame axially of the said rod, a connection between the said rod and the said shaft for driving one from the other and for reciprocating one from the other transversely of the machine, means for disengaging said connection, a brake drum on said shaft, a lever pivoted toward its center on the machine frame, a weight adjustably mounted toward each end of the said lever, a brake band contacting said brake drum and attached at one end to the machine frame and at the other end to said lever, means for shifting said weight along said lever to adjust the braking effect of said band on said drum, and means for moving said shaft and said mill roll rod laterally of the machine.

8. In a slitting machine shear cut slitting means, means for passing a pellicle from a mill roll past the slitting means, mill roll supporting and controlling mechanism comprising a mill roll support mounted for rotational and sliding motion in the machine frame, means rotatable by said support for adjusting said support laterally of the machine, a lever pivoted toward its center on the machine frame, a weight adjustably mounted toward each end of said lever, a brake on said means operable by said lever, means for shifting the said weight along said lever to adjust the braking effect thereof, and means for moving said mill roll support laterally of the machine.

9. In a slitting machine shear cut slitting means, means for passing a pellicle from a mill roll past the slitting means, mill roll supporting and controlling mechanism comprising a mill roll support rotatable with the mill roll, means for moving said mill roll support transversely of the machine, means for retarding the rotation of said support comprising a brake in operative but easily releasable relation to said support, means for operating the brake comprising a lever pivoted toward its center having an adjustable weight toward each end and means for quickly moving a said weight.

10. In a slitting machine shear cut slitting means, means for passing a pellicle from a mill roll past the slitting means, a mill roll supporting means, means for controlling said mill roll supporting means and a connection between said controlling means and said supporting means comprising spaced studs projecting from one said means, and a flat plate on the other said means in operative relation to the said studs, means to engage and disengage said connecting means, and heads on said studs to overlap said plate and prevent its withdrawal when said plate is engaged with said studs.

11. In a slitting machine a mill roll support, controlling means for said support, and a connection between said means and said support comprising pins projecting from one said element, a plate on the other of said elements capable of fitting between said pins, and means on said pins for preventing the endwise withdrawal of said plate when said plate is in contact with said pins.

12. In a slitting machine a mill roll support, a brake for controlling the motion of said support, and means for adjusting said brake comprising a lever pivoted toward its center having a weight toward either end, one of which weights is adjustable.

13. In a slitting machine a rotatable mill roll holder, a brake operatively and adjustably connected thereto, means for moving the mill roll holder axially while the machine is in operation, three driven rollers having surfaces capable of gripping a flexible cellulosic pellicle so arranged that there is a minimum of space between them and that each will be substantially encircled by the pellicle, shear cut means for slitting the pellicle comprising a driven slitting member having direct contact with the surface of a said driven roller and supporting substantially the entire width of the pellicle at the moment of slitting, means for driving said driven roller, means for identifying the surface speeds of said member and roller, a take-off roller mounted by anti-friction bearings on a shaft driven in a direction to advance the pellicle and having a pellicle-gripping surface, and means for gathering the slit pellicles at substantially equal tension.

14. In a slitting machine a rotatable mill roll holder, an adjustable brake operatively associated therewith, means for moving the mill roll holder axially while the machine is in operation, at least two rollers with surfaces capable of gripping a flexible cellulosic pellicle and so arranged that there is a minimum of space between them and that each will be substantially encircled by the pellicle, shear cut means for slitting the pellicle including a driven slitting member having direct resilient contact with the surface of a said roller and which supports substantially the entire width of the pellicle at the moment of slitting, means for driving said contacting member and roller, means for identifying the surface speeds of said member and roller, a roller having a pellicle-gripping surface mounted for motion about a shaft driven in a direction to advance the pellicle, and means for gathering the slit pellicles at substantially equal tension.

15. In a slitting machine a rotatable mill roll holder means for braking it, smoothing rollers with surfaces for gripping a flexible cellulosic pellicle so arranged that there is a minimum of space between them and that each will be substantially encircled by the pellicle, shear cut means for slitting the pellicle including a driven slitting member having direct resilient contact with the surface of a smoothing roller, means for supporting the pellicle at the moment of slitting, means for driving said contacting member and roller, means for identifying the surface speeds of said member and roller, a roller having a pellicle-gripping surface mounted for motion with and about a driven shaft, means for gathering the slit pellicles at substantially equal tension, and means for adjusting the pellicle transversely of the machine.

16. In a slitting machine means for supporting a mill roll, means for unwinding a pellicle from the mill roll, means for regulating with adjustable tension the unwinding of the pellicle, shear cut means for cutting the pellicle, driven means for transporting, gripping, and smoothing the pellicle between mill roll and cutters, means for supporting substantially the entire width of the pellicle during cutting, means for transferring the pellicle from the smoothing means directly to the supporting means, driven means for transporting, gripping, and guiding the slit pellicles between the slitters and the gathering means, driven means for gathering the pellicles, and means for adjusting the pellicle laterally while the machine is running.

17. In a slitting machine a mill roll, means for regulating the unwinding of the pellicle from the mill roll, shear cutting means, means for transporting gripping, and smoothing the pellicle, means for laterally supporting the pellicle during cutting, means for transferring the pellicle from the smoothing means to the cutting means without permitting wrinkling of the pellicle, means for transporting, gripping, and guiding the slit pellicles between the slitters and the gathering means, means for gathering the pellicles, and means for adjusting the pellicle laterally while the machine is running.

18. In a slitting machine a mill roll, shear cutting means, gathering means, means for regulating the unwinding of the pellicle, means between mill roll and slitter for smoothing the pellicle, means for transferring the pellicle unwrinkled to be slit, means for keeping the pellicle unwrinkled during slitting, and means for controlling the pellicle between the slitting means and the gathering means.

19. In a slitting machine a pellicle suply, shear cutting means, gathering means, means for delivering the pellicle to the cutters at uniform speed and tension, means for smoothing the pellicle and for transferring it to the slitters unwrinkled including a series of smooth rollers substantially encircled by the pellicle in closest relationship to each other and of which the last makes contact with a means for keeping the pellicle unwrinkled during slitting.

20. In a slitting machine shear cutting means comprising circular knives having resilient point contact, means for smoothing a pellicle comprising a plurality of rollers having gripping surfaces arranged to be substantially completely encircled by the pellicle, pressure means for further smoothing the pellicle, and means for supporting the pellicle laterally from the surface of the pressure means until slitting is completed.

21. In a slitting machine cutting means comprising circular knives having resilient point contact, means for smoothing a pellicle comprising a plurality of rollers spaced a minimum distance apart and each arranged to be substantially completely encircled by the pellicle, pressure means for smoothing the pellicle comprising a cutting member and a smoothing member and means for supporting the pellicle laterally until slitting is complete.

22. In a slitting machine cutting means comprising circular knives having resilient point contact and means for smoothing a pellicle before cutting comprising a plurality of rollers spaced a minimum distance apart and each arranged to be substantially completely encircled by the pellicle.

23. In a slitting machine cutting means comprising circular knives having point contact, and means for smoothing a pellicle before cutting comprising three rollers spaced a minimum distance apart and each arranged to be substantially completely encircled by the pellicle.

24. In a slitting machine cutting means comprising cooperating circular knives, and means for smoothing the pellicle before cutting comprising three rollers spaced a minimum distance apart and arranged so that each will be as nearly as possible completely encircled by the pellicle.

25. In a slitting machine cutting means comprising circular knives having point contact and pressure means for smoothing a pellicle before cutting comprising in contact a smoothing roller and a cutting member.

26. In a slitting machine cutting means comprising circular knives and pressure means for smoothing a pellicle comprising a smoothing roller which supports a cutting member upon its surface.

27. In a slitting machine pellicle-controlling means comprising driven contacting rollers between which the pellicle may be passed, one of said rollers being positively driven and the other of said rollers being mounted for rotation with respect to its driving means.

28. In a slitting machine a driven shaft, a roller mounted by anti-friction bearings on said shaft, a resilient covering on said roller, and a shear cut slitting member resting on said covering.

29. In a slitting machine a driven shaft, a roller mounted on said shaft, a resilient covering on said roller, a driven shear cut slitting member resting on said covering and means for equalizing the surface speeds of said member and said roller which comprises mounting one of said driven elements for rotational movement about its driven shaft.

30. In a slitting machine rotary shear cutting means, a deflector extending the full length of one element thereof, a take off roller rotatably mounted on a driven shaft, and winding means comprising a shaft mounted in the machine frame, a socket in said shaft, a bearing seat in said machine frame, and a mandrel provided at one end with a head to fit the socket and provided at the other end with a bearing to fit the seat.

31. In a slitting machine rotary shear cutting means having point contact, a deflector in contact with one element thereof, and a take off roller rotatably mounted on a driven shaft.

32. In a slitting machine rotary shear cutting means having point contact, a take off roller rotatably mounted on a driven shaft, and winding means comprising a driven shaft, a bearing seat and a mandrel provided with means for attachment to the shaft and seat.

33. In a slitting machine rotary shear cutting means, a take-off roller rotatably mounted on a driven shaft, and winding means comprising a driven shaft, a bearing seat, and a mandrel provided with means for attachment to the shaft and to the seat.

CLARENCE E. COLEMAN.
LEE B. MOLYNEUX.